US010841099B2

(12) United States Patent
Morgner

(10) Patent No.: US 10,841,099 B2
(45) Date of Patent: Nov. 17, 2020

(54) METHOD FOR GENERATING A DIGITAL SIGNATURE

(71) Applicant: Bundesdruckerei GmbH, Berlin (DE)

(72) Inventor: Frank Morgner, Gruenheide (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 28 days.

(21) Appl. No.: 15/327,804

(22) PCT Filed: Jul. 17, 2015

(86) PCT No.: PCT/EP2015/066459
§ 371 (c)(1),
(2) Date: Jan. 20, 2017

(87) PCT Pub. No.: WO2016/016023
PCT Pub. Date: Feb. 4, 2016

(65) Prior Publication Data
US 2017/0201376 A1     Jul. 13, 2017

(30) Foreign Application Priority Data

Jul. 31, 2014     (DE) .................. 10 2014 110 859

(51) Int. Cl.
*H04L 9/32*     (2006.01)
*G06Q 20/38*     (2012.01)

(52) U.S. Cl.
CPC ....... *H04L 9/3247* (2013.01); *G06Q 20/3827* (2013.01); *H04L 9/3226* (2013.01); *H04L 9/3234* (2013.01); *H04L 9/3231* (2013.01); *H04L 2209/88* (2013.01)

(58) Field of Classification Search
CPC .... H04L 9/3247; H04L 9/3226; H04L 9/3231
See application file for complete search history.

(56) References Cited

U.S. PATENT DOCUMENTS 6,959,382 B1 * 10/2005 Kinnis .................. G06F 21/602
  713/168
7,302,585 B1   11/2007 Proudler et al.
(Continued)

FOREIGN PATENT DOCUMENTS

| DE | 10233297 A1 | 2/2003 | |
| EP | 1056014 A1 | 11/2000 | |
| GB | 2391438 A * | 2/2004 | ............. G06F 21/64 |

OTHER PUBLICATIONS

International Preliminary Report on Patentability for International Application No. PCT/EP2015/066459 dated Feb. 9, 2017.
(Continued)

*Primary Examiner* — Ellen Tran
(74) *Attorney, Agent, or Firm* — Harness, Dickey & Pierce, P.L.C.

(57) ABSTRACT

Method for generating a digital signature for a digital content using a computer and trustworthy signature hardware connected thereto for data exchange, includes generating a message digest from the digital content by an application executed on the computer; generating descriptive data relating to the electronic digital signature; transmitting the message digest and the descriptive data to the trustworthy signature hardware; outputting the descriptive data at an output device of the trustworthy signature hardware; carrying out a user interaction as precondition for the continuation of the method; generating signature data from the message digest and the descriptive data by the trustworthy signature hardware; and transmitting the signature data from the trustworthy signature hardware to the computer and in particular the application.

16 Claims, 2 Drawing Sheets

(56) References Cited

U.S. PATENT DOCUMENTS

Figure 1:
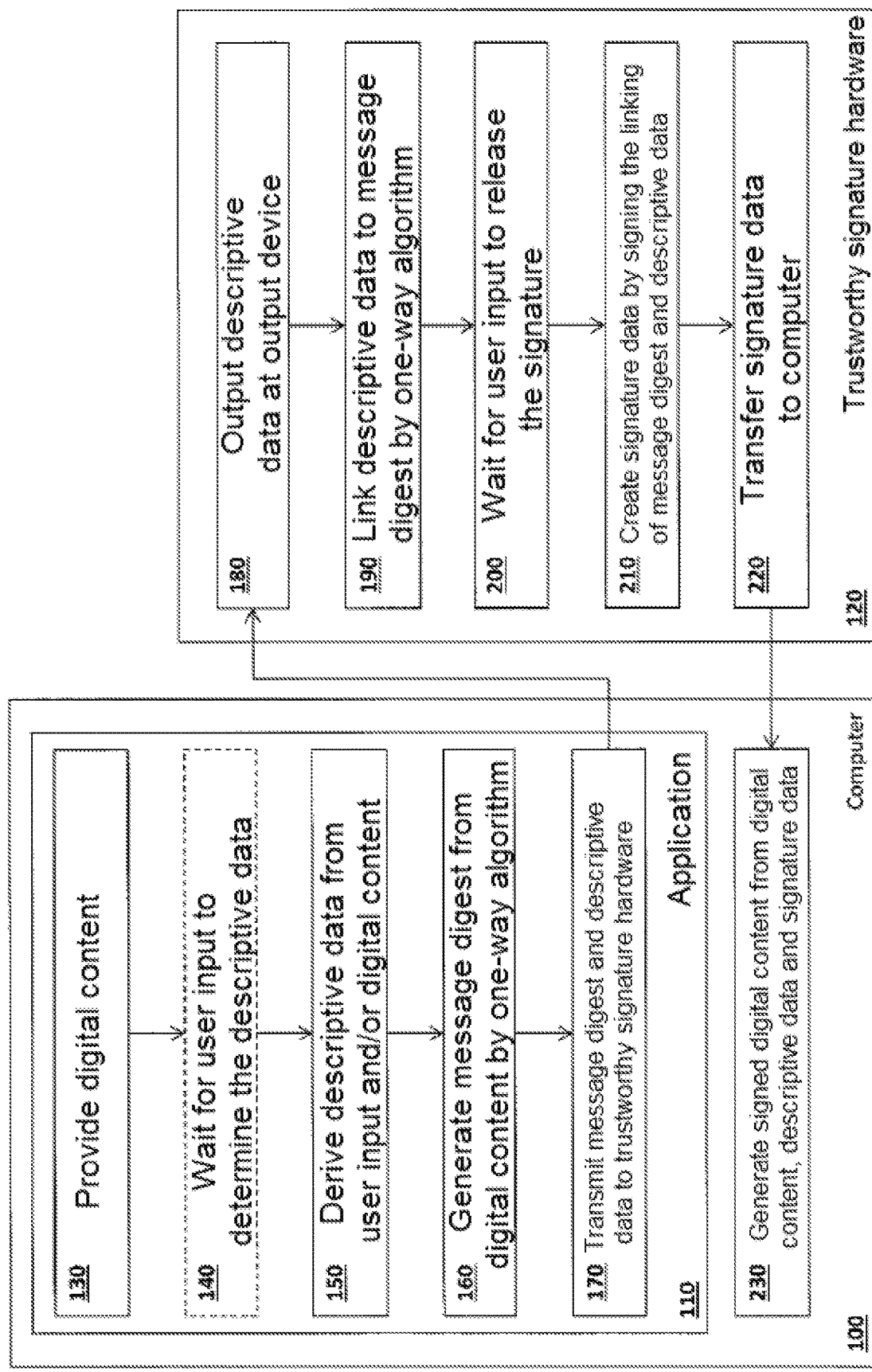

| | | | |
|---|---|---|---|
| 2005/0039018 A1 | 2/2005 | Wittkotter | |
| 2005/0246539 A1* | 11/2005 | Cofta | H04L 9/3234 713/176 |
| 2007/0220260 A1* | 9/2007 | King | G06F 21/64 713/176 |
| 2008/0022128 A1 | 1/2008 | Proudler et al. | |
| 2011/0231645 A1* | 9/2011 | Thomas | H04L 9/321 713/150 |
| 2012/0124381 A1* | 5/2012 | Kim | H04L 9/0643 713/176 |

OTHER PUBLICATIONS

"Technical Guideline BSI Requirements for Smart Card Readers Supporting eID and eSign Based on Extended Access Control", Mar. 22, 2013 (Mar. 22, 2013), XP055201694, Retrieved from the Internet <URL:https://www.bsi.bund.de/SharedDocs/Downloads/EN/BSI/Publications/TechGuidelines/TR03119/BSI-TR-03119_V1_pdf.pdf;jsessionid=79CD8160ADF463A8659D2C22B25A88B1.2_cid359?__blob=publicationFile> [retrieved on Jul. 10, 2015].

BSI: "Technische Richtlinie TR-03117: eCards mit kontaktloser Schnittstelle als sichere Signaturerstelluingseinheit", Jan. 1, 2009 (Jan. 1, 2009), pp. 1-43, XP055221635, Retrieved from the Internet <URL:https://www.bsi.bund.de/SharedDocs/Downloads/DE/BSI/Publikationen/TechnischeRichtlinien/TR03117/BSI-TR-03117.pdf?__blob=publicationFile> [retrieved on Oct. 16, 2015].

International Search Report PCT/ISA/210 for International Application No. PCT/EP2015/066459 dated Jul. 17, 2015.

Written Opinion of the International Searching Authority PCT/ISA/237 for International Application No. PCT/EP2015/066459 dated Jul. 17, 2015.

* cited by examiner

METHOD FOR GENERATING A DIGITAL SIGNATURE

CROSS-REFERENCE TO RELATED APPLICATIONS

This application is a national phase under 35 U.S.C. § 371 of PCT International Application No. PCT/EP2015/066459 which has an International filing date of Jul. 17, 2015 which claims priority to German Application No. 10 2014 110859.0, filed Jul. 31, 2014, the entire contents of each of which are hereby incorporated by reference.

TECHNICAL FIELD

The following presentations concern the field of technical applications of digital signatures and in particular the defence against manipulation attempts.

PRIOR ART

Many methods for generating digital signatures are known from the prior art. Fundamental aspects of digital signatures are presented for example in the written work "Bruce Schneier: Applied Cryptography (1996) John Wiley & Sons" in chapter 2.6. A standard for a cryptographically protected message exchange is defined in the publication "Internet Engineering Task Force: RFC 5652—Cryptographic Message Syntax (2009)".

The security policies resulting from relevant legal provisions for technical implementations for the generation of digital signatures with evidential value, i.e. what are known as qualified digital signatures, are compiled in the publication "BSI TR-03114 Stapelsignatur mit dem Heilberufsausweis (Batch signature with ID card for healthcare professionals) (2007)" in chapter 6.2. The security policy mentioned therein constituted by "sole control" does not allow the cryptographic key necessary for the digital signature to remain on the computer or in particular a workstation computer. The cryptographic keys are therefore often accommodated in external storage media and in particular in the protected memory of Smartcards. The use of Smartcards additionally makes it possible to make the generation of the digital signature subject to the precondition of a prior authentication of the user. Insofar as biometric data and/or passwords of the user have to be transmitted to the Smartcard for this purpose, many security risks resulting from the possibility of unnoticed unauthorised access to the computer or manipulation thereof can be ruled out with manipulation-protected card readers. For this purpose, reference is made to the CCC (Central Credit Committee) specification of card reader security classes issued by the German Banking Industry Committee. Card readers of security class 3 are provided with a numerical keypad and a display and enable sufficient protection against manipulation in typical online banking applications. However, these card readers can be used only to a limited extent in other applications. The limitations lie at the extent to which the features with which the provided display is equipped can still ensure the security policy of a "secure display". By way of example, a card reader having a single-line text display cannot provide this "secure display" if the digital signature is to relate to a digital content that cannot be displayed with said display, such as in particular a digitally coded photographic image or a dictation stored as an audio sequence. In such a case, the user cannot see, on the basis of the output of the card reader protected against manipulation, whether the signature has actually been created for the intended digital content. The user can merely rely on the fact that the digital content selected by the user, after inspection of said content, leads faithfully to the signature. This reliance, however, is not substantiated in all cases, as shown by manipulation scenarios presented in the meantime. Reference is made in this respect to the publication "Alexander Koch: Ein Mittelsmannangriff auf ein digitales Signiergerät (An intermediary attack on a digital signature device) (2011) Christian-Albrechts-Universität zu Kiel (Christian-Albrechts University of Kiel)".

OBJECT AND PRIMARY SOLUTION

The object of achieving a high level of security compared to known manipulation scenarios even with simply equipped card readers has not yet been achieved satisfactorily in the prior art. Accordingly, the present object is to provide improved approaches for generating digital signatures with which the above-presented safety risks can be attenuated.

This object is achieved from a first aspect by the basic method equipped with the features of claim 1 for generating a digital signature.

This basic method for generating a digital signature for a digital content by means of a computer and a trustworthy signature hardware connected thereto for data exchange comprises a step for generating a message digest from the digital content by an application executed on the computer and for generating descriptive data relating to the digital signature. The basic method also comprises a step for transmitting the message digest and the descriptive data to the trustworthy signature hardware. In a further step of the basic method, a display of the descriptive data is output on an output device of the trustworthy signature hardware. The output device is in particular a human-machine interface (HMI), which outputs a display, perceptible by humans, of the descriptive data. In a further step of the basic method, a user interaction is performed as a precondition for the continuation of the method. In a further step of the basic method, signature data are generated from the message digest and the descriptive data by the trustworthy signature hardware and are transmitted from the trustworthy signature hardware to the computer and in particular the application.

Here, "trustworthy signature hardware" means any device protected or defended against manipulation and connectable to a computer and in particular a workstation computer for data exchange, which device is designed to carry out an authentication of a user, to output a display, perceptible by humans, depending on the supplied data, and to generate a digital signature on supplied data. By way of example, a trustworthy signature hardware is realised by a card reader of security class 3 with a personal signature card. The connection of the card reader to the computer can be established, as is known, in a wired manner or wirelessly. By way of example, a wired connection via what is known as the USB port can be selected in order to connect the card reader to a workstation computer in order to eradicate the need for an independent power supply to the trustworthy signature hardware. Equally, the trustworthy signature hardware can be implemented by a comprehensively equipped Smartcard, chip card or a general hardware token which, in addition to an implementation of the signature function, also has a display or a similar output device for displaying data in a manner perceptible to humans, and also an interface for direct data exchange with the workstation computer.

Furthermore, any composition of digital data that is structured or can be structured with regard to the use context is understood to be "digital data". In particular, a digital content can be given by a linear file or a row in a database table.

Furthermore, digital data for describing a signature purpose or an objective or subjective content-related classification of a digital content are referred to as "descriptive data". From a technical viewpoint the descriptive data are characterised at least in that the reproduction thereof in a manner perceptible by humans or one of many possible reproductions, perceptible by humans, by means of the output device of the trustworthy signature hardware in question is possible. In this regard, the determination of the descriptive data is not absolute, but is to be understood in respect of the particular technical equipment of the trustworthy signature hardware. By way of example, sequences or patterns of letters, numbers or simple symbols in a trustworthy signature hardware with single-line block matrix text display can be descriptive data. If, in another exemplary case, the trustworthy signature hardware comprises a loudspeaker, all natural linguistic sequences of words, numbers, letters, figures and symbols as well as all types of digitally coded audio sequences can be descriptive data in any case.

Here, a digital code typically shortened to a standardised length is also referred to as a "message digest" and is characteristic for a specific digital content. The message digest is preferably generated by a cryptographically secure one-way function. By way of example, a message digest can be generated by the algorithms MD2, MD4, MD5 known from the prior art and what is known as the "secure hash algorithm (SHA)".

Furthermore, the designation "digital signature" of a digital content is given to a compilation of digital data based on said content and derived therefrom, from which compilation of data the creator can be ascertained via a cryptographic method and a particular cryptographic key. This compilation of digital data is also referred to as "signature data".

A potential advantage of the basic method defined above can be considered that of being able to identify in many cases a manipulation of a digital signature within the scope of the validation, i.e. during the subsequent checking of the correlation between the digital document and the creator of the signature, even with use of a simply equipped trustworthy signature hardware. This is based on the fact that the user, with the descriptive data, cannot add to the digital content a knowingly falsifiable description of the purpose pursued with the digital content provided originally for the signature or an indication of a declaration issued therewith. Even if, by means of a manipulation in the above-described manner, the digital signature is generated not for the digital content provided by the user, but is generated for another digital content, the digital signature thereof is valid only in conjunction with the descriptive data checked by the user prior to the generation of the signature data and confirmed as correct. An attacker therefore cannot remove the description in the descriptive data that is incorrect for the falsified digital content without destroying the validity of the signature. The specified purpose or intention contained in the descriptive data can later provide the user with the possibility of casting doubt on the assumption of the authenticity of the digital content tied to the validity of the digital signature. Alternatively or additionally, there is the possibility in business relationships to transmit, by the description, an indication of which the content-related compatibility with the digital content is automatically or manually checked prior to the further processing. Expedient developments and embodiments of the basic method are specified in claims 2 to 14.

In one embodiment of the basic method, part of the signature data is dependent in any case both on the message digest and on the descriptive data.

A potential advantage of this embodiment can be considered to be the fact that the signature data produce a non-detachable connection between the message digest and the descriptive data. In particular, the possibility of making a falsification of the message digest or the descriptive data unidentifiable by an isolated adaptation of part of the signature data is ruled out as a result.

In a further embodiment of the method defined above, the signature data are derived from a linking of the message digest to the descriptive data. Here, a one-way function is preferably applied to the descriptive data and/or the message digest.

A potential advantage of this embodiment can be considered to be the fact that the linking generated as a basis for the generation of the signature data can retain the format provided for the application of the signature function. In this way, the signature function implemented in the trustworthy signature hardware can be adopted, unchanged, from the prior art.

In a further embodiment of the method defined above, identical one-way functions are designed to link the descriptive data with the message digest on the one hand and to generate the message digest from the digital content on the other hand.

A potential advantage of this embodiment can be considered to be the fact that only an implementation of precisely this one-way function is thus required for verification of the signature. In particular, the one-way function can be determined such that it can satisfy a known standard in respect of the generation of the message digest. A rearward compatibility of the trustworthy signature hardware can be achieved as a result.

In a further embodiment of a method defined above, the user interaction is required in order to release the generation of the signature data to an input interface of the trustworthy signature hardware. The user interaction in yet a further embodiment can comprise the authentication of the user. The authentication can preferably include the input of a password or the detection of a biometric feature of the user via an interface of the trustworthy signature hardware.

Here, "authentication" designates any technically detectable handling of a user in relation to the trustworthy signature hardware which delivers a sufficiently trustworthy indicator with regard to the identity, role, or position of trust of the user in view of the pursued purpose. By way of example, an authentication can be carried out in the widely known manner by detection of ownership and knowledge. By way of example, the access to a mobile telephone network not only presupposes the ownership of a suitable SIM card, but also the knowledge of the PIN for release thereof. Alternatively or additionally, the automatic capture of a biometric feature of the user can be included for the purpose of "authentication".

A potential advantage of this embodiment can be considered to be the fact that the release of the user cannot be replaced by an unidentified manipulation of the computer. Thus, an application modified by computer viruses or comparable malware on the computer is in particular prevented from controlling a connected card reader in a concealed manner in order to generate signatures of falsified digital contents. Otherwise, by way of example, a malware program could create falsified orders with the digital signature of the user as soon as the user has connected the trustworthy signature hardware to the computer and has authenticated himself to the computer.

In a further embodiment of one of the above-defined methods, the descriptive data are generated on the computer depending on the digital content. In particular, the descriptive data are extracted from the digital content at a predetermined or marked point. By way of example, the descriptive data can be removed from a marked region of an XML-coded digital content or from the metadata of digital contents in PDF, RTF, or SVG format.

A potential advantage of this embodiment can be considered to be the fact that the user is relieved of having to input or select the descriptive data. In addition, the automatic extraction of the descriptive data from the digital content, in particular in business relationships, enables the use of prepared electronic forms, the key content of which is summarised by the application in the descriptive data and is confirmed by the signature of the user. With sufficiently clear allocation of the descriptive data to the receiver and process, a manipulation can be ruled out practically with certainty. In particular, the descriptive data can be determined by the receiver of the digital content with the electronic form, whereby an automatic verification is possible.

In a further embodiment of one of the methods defined above, the descriptive data are derived as a whole or in part from a user input and in particular a text input of the user. Alternatively or additionally, the descriptive data are derived from a screen view selected by the user and/or from a speech playback of the digital content selected by the user.

A potential advantage of this embodiment can be considered to be the fact that the user can himself determine the descriptive data. Provided the descriptive data here are derived from reproductions of the digital content that are perceptible by humans, an advantage can be considered to be the fact that the creation of the descriptive data is facilitated by the recourse to the digital content. This can be a particular advantage in particular in the barrier-free realisation. If, for example, a visually impaired user can "read out" a digital content from his computer, he will appreciate the possibility of adopting part of the audio content into the descriptive data by means of simple input operations.

In a further embodiment of one of the methods defined above, the text input or screen view contained in the descriptive data are displayed on a monitor of the trustworthy signature hardware and/or the text input and/or speech playback contained therein are/is reproduced by a loudspeaker of the trustworthy signature hardware. In particular, a text input contained in the descriptive data is acoustically output by the trustworthy signature hardware in a synthetic speech playback.

In a further embodiment of one of the methods defined above, the transmitted signature data are combined on the computer and in particular by the application with the descriptive data and the digital content to form a verifiable, signed digital content.

A potential advantage of this embodiment can be considered to be the fact that all data necessary with regard to a later verification of the digital signature can thus be managed in a correlated manner. The risk that the verification of the digital signature will be impossible on account of an accidental deletion of part of the data can thus be counteracted.

In a further embodiment of one of the methods defined above, the validity of the signature data in respect of the message digest of the digital content extracted from the verifiable, signed digital content and in respect of the descriptive data extracted from the verifiable, signed digital content is also checked in order to verify the verifiable, signed digital content.

The object stated at the outset is achieved from a second aspect by the data processing device equipped with the features of claim 15 and from a third aspect by the computer program equipped with the features of claim 16.

DESCRIPTION OF A PREFERRED IMPLEMENTATION

Figure 2:
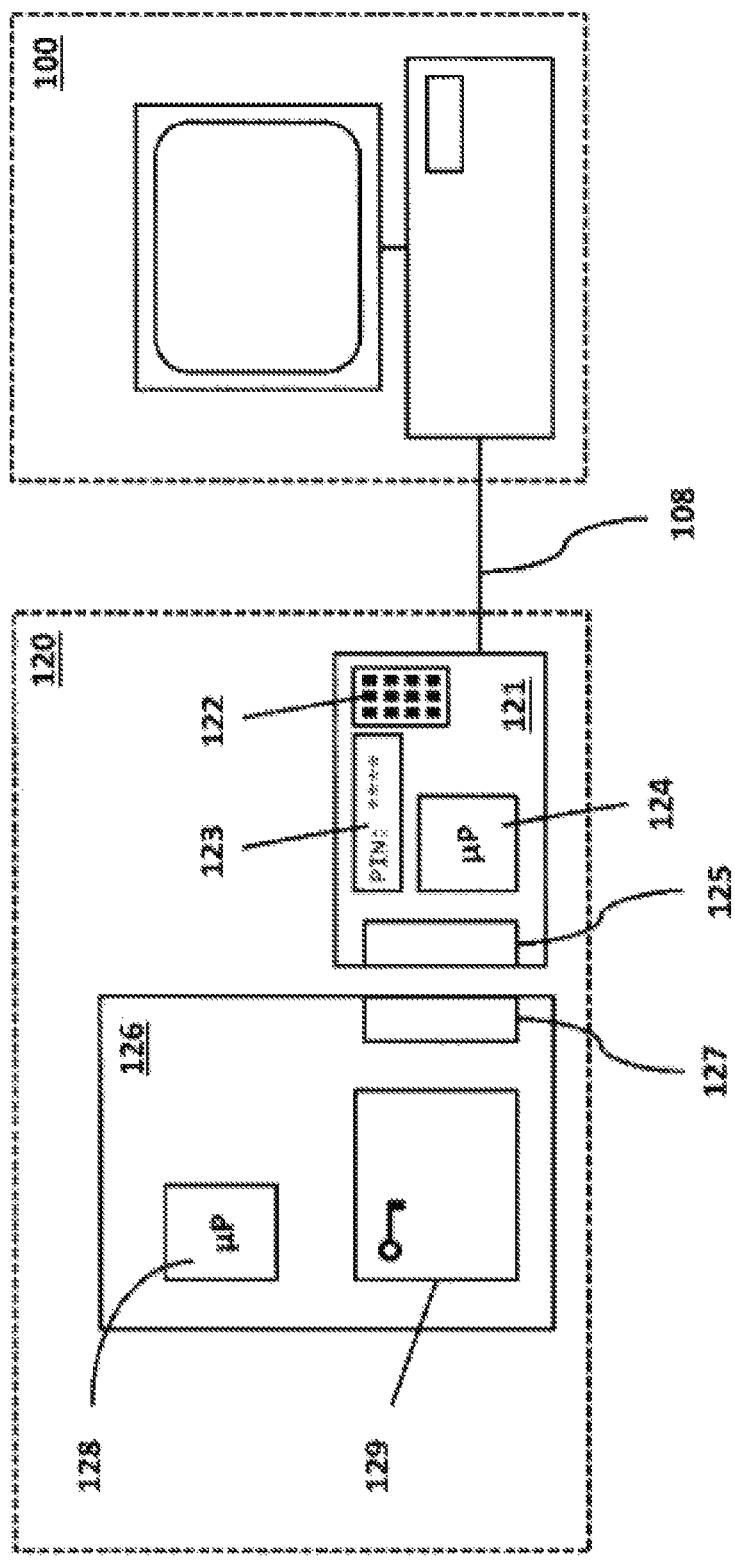

An exemplary implementation of the methods defined above will be described hereinafter with reference to the accompanying drawings, in which:

FIG. 1 shows a schematic illustration of an exemplary method for generating a digital signature with descriptive data; and FIG. 2 shows a schematic illustration of an exemplary data processing device for carrying out the method according to FIG. 1.

The method illustrated in FIG. 1 for generating a digital signature proceeds from a data processing device according to FIG. 2. This data processing device comprises a computer and in particular a workstation computer 100 and also a trustworthy signature hardware 120, which are connected via a data link 108 in order to exchange data.

The computer 100 is designed to execute an application 110 and in particular an interactive program. The computer 100 also comprises the typical input and output apparatuses known from the prior art, which are not illustrated in the diagram, apart from the screen 102, and therefore will be mentioned only briefly hereinafter. Available input apparatuses for the further explanations will be assumed in any case to be a keypad and a pointing device in the manner of a touchpad or a mouse. In order to describe particular variants of the exemplary method, the availability of speech input and/or output apparatuses is additionally assumed. These can be embodied in particular as a microphone and loudspeaker.

The trustworthy signature hardware 120, in the exemplary situation, comprises a card reader 121 and a Smartcard 126 connected to the card reader for data exchange.

The card reader 121, which is illustrated by way of example, corresponds in terms of its equipment to security class 3 and accordingly comprises a single-line display 123 and a numerical keypad 122. The card reader 121 also has a software-based microprocessor 124 and an interface 125 for communication with the Smartcard 126. In a simple implementation, the interface 125 of the card reader 121 can be a contact block for contacting a contact array of the Smartcard 126 inserted into a holder. These details are known from the prior art and are not illustrated in the diagram, accordingly. The software set-up of the microprocessor 124 comprises codes for controlling the data exchange via the interface 125 and the data link 108, the control of the display 123, and the read-out of inputs from the keypad 122. In addition, the software set-up of the microprocessor 124 comprises codes with implementations of algorithms for cryptographic data processing. Further details in this regard are provided in the following presentation of the exemplary method.

The Smartcard 126 furthermore comprises an interface 127 for data exchange with the card reader 121 via the corresponding interface 125 thereof. The Smartcard also has a memory 129, from which a cryptographic key can be read. However, the reading process is not possible directly via the interface 127, and instead must be conveyed through a software-based microprocessor 128 also provided in the Smartcard 126. The readout of the cryptographic key from the memory 128 can thus be provided conditionally on prior authentication of the user. This authentication is carried out in a simple realisation as a query of a PIN, which is input via the keypad of the card reader 121 and is transmitted from the microprocessor 124 thereof, via the relevant interfaces 125, 127, to the microprocessor 128 of the Smartcard 126.

The Smartcard 126 can be, in particular, a signature card or an equivalently equipped electronic document, for example an electronic personal identity document (ePID).

The exemplary method shown in FIG. 1 is implemented in its first steps by an application 110 executed on the computer 100. In a first step of the method 130, the application 110 provides the digital content for which the digital signature is to be generated. The provision can comprise in particular the loading of the digital content from a storage location. The digital content can be created or amended in particular also by the application 110. In particular, a digital content loaded from a storage location can be modified by the application 110 via control procedures performed by the user. By way of example, this type of provision can be implemented specifically in that the user loads a prepared electronic form into the application 110 via a network access and adds the provided particular data to this digital content via a subsequent interaction or a dialogue.

In a further optional step 140, the application 110 can expect a user input. With this user input, the user can define a description of the digital signature. If the computer is a conventional workstation computer, the user input can be a simple keypad input. Alternatively, the user can also directly determine the content of the descriptive data via another input interface of the computer, for example the mouse or a pointing device. Again alternatively or additionally, the user can indirectly determine the content of the descriptive data by the selection of a reproduction of the digital content. In particular, the user can select part of a screen view of the digital content using the mouse or the pointing device. Alternatively or in addition, the user can select part of a natural linguistic reproduction of the digital content via an input interface. In both cases, the application can be designed to derive the description from the data of the digital content that was designated by the user by the input. By way of example, the user could mark, in the screen view of a text document, a line which is then extracted by the application and transferred into the description. Alternatively or additionally, the user could mark moments in time of a natural linguistic reproduction of the digital content that include the content to be used for the description of the signature.

The application 110 is also designed in the exemplary situation to derive descriptive data for the digital signature in a further step of the method. These descriptive data contain a digital representation of a description of the signature. Provided the above-explained step 140 of the method has been carried out with the user input, the application 110 can derive the descriptive data from the description determined therewith. Otherwise, or if more than the description determined by the user is required, the application 110 must derive the (additional) descriptive data from another source. In particular, it is appropriate to derive the descriptive data directly from the digital content. This then appears to be particularly expedient when the digital content contains text data to be described which, as such, are accessible via a known digital access structure. An example of such describing text data are what are known as the metadata, which are provided in many digital data formats.

In a further step 150 of the exemplary method, the application 110 generates a message digest from the digital content. For this purpose, in a particular embodiment, a one-way algorithm can be applied to the data of the digital content. The one-way function can be one of the usual hash functions. The algorithm for generating the message digest can be adopted, unchanged, from the prior art for typical applications and therefore is not presented in greater detail. The message digest is then transmitted together with the descriptive data in a further step 170 by the application 110 from the computer 100 to the trustworthy signature hardware 120 via the data link mentioned in the introduction.

The following step 180 of the method is carried out by the trustworthy signature hardware 120 and comprises the output of the descriptive data in a representation perceptible by humans via an output device of the trustworthy signature hardware 120. In the exemplary situation, the string of characters determined with the descriptive data is displayed in particular on the display 123 of the card reader 121. Since this display is dependent exclusively on the descriptive data transmitted to the trustworthy signature hardware 120, it cannot be influenced via the data line by a harmful application on the computer 100. Thus, the user can trust that the digital signature generated as the course of the method continues relates in any case to the displayed descriptive data and is not validated with other data. In a particular embodiment, the trustworthy signature hardware 120 and in particular the card reader 121 could be equipped with a loudspeaker for outputting a spoken natural linguistic representation of the determined string of characters. In this case, the synthetic speech generation, for security reasons, should be effected by the trustworthy signature hardware. A synthetic speech generation on the computer and the transmission of the speech in an audio format to the trustworthy signature hardware would be accessible to manipulation.

In a further step 190 of the exemplary method, the descriptive data are linked to the message digest by a one-way algorithm executed by the trustworthy signature hardware 120. The result of the linking expediently comprises the data length which must be directly processed by the signature algorithm. In this respect, a specific realisation can form the link in that a hash value having the length of the message digest is firstly derived from the descriptive data via a further one-way algorithm, and from this the desired result is derived by an exclusive-or (XOR) operation with the message digest. The exclusive-or (XOR) operation is therefore predestined at this point because the result thereof in any binary point is dependent on the relevant binary points of the operands. The linking from the descriptive data and the message digest therefore already no longer can be detached. Regardless of the type of generation of the signature data, a falsification by blockwise assembly of digital content, descriptive data and the valid parts of the signature data therefore is ruled out. This can be advantageous when the signature data are generated by a symmetric algorithm in what is known as an "electronic code book" (ECB) mode. Alternatively and from this viewpoint, the one-way algorithm used to generate the message digest in the prior step 160 could be applied equally to a linear chaining of the message digest and the descriptive data. In both cases, the result advantageously has a data length corresponding to that of the message digest. This result can thus be directly processed by a signature algorithm tailored to the message digest.

In a further step 200 of the exemplary method, the trustworthy signature hardware 120 anticipates a user input as evidence for the intention of the user to generate the digital signature with the descriptive data in accordance with the previously output representation. In the exemplary situation, the user input can be implemented by pushing a button on the keypad of the trustworthy signature hardware 120. In an improved embodiment, provision could be made, in order to avoid accidental maloperations, such that the user inputs a sequence of numbers displayed on the display of the trustworthy signature hardware 120 via the keypad thereof. In this case, the display of the sequence of numbers can be prefixed by a corresponding indication regarding the meaning of the input, which should then be noted regularly by the user. In particular, the risk of a manipulated instruction of the user via the output generated by the application on the computer can thus be reduced. In principle, it should be noted at this juncture that the security of the method is capitalised on when the interaction with the user in the event of the release of the signature is limited to the trustworthy signature hardware.

After the release, in a further step 210 of the exemplary method, the signature data are generated by application of a signature algorithm to the result of the linking of message digest and descriptive data. These signature data are transmitted in a further step 220 of the exemplary method from the trustworthy signature hardware 120 to the computer 100. As indicated in the exemplary situation, the objective of this transmission does not have to be the application 110 in each case. In principle, a separate handling of the digital content, of the descriptive data, and the signature data based thereon is possible. Accordingly, a user could first forward the digital content, and then later could "subsequently deliver" the signature data and the descriptive data necessary for validation of the signature data. However, this approach presupposes that the information regarding the correlation between the digital content, the descriptive data, and the signature data is not lost. On this basis, the application could be designed to manage this information. Alternatively, the application 110 could be designed to combine the signature data received from the trustworthy signature hardware with the descriptive data and the digital content to form a data aggregate, which could be referred to as signed digital content. This aggregation could be generated for example in the form of a linear file which can be structured or which is structured, in particular as a file in a mark-up or in an archive format. In the exemplary implementation of the method, the signed digital content is generated by another application (not denoted) on the computer in a step 230.

The validation of the signature, in accordance with the structure of the method, is not possible without the original descriptive data. In the present case, the result of the linking of message digest and descriptive data, which was used in the previously described step 210 of the exemplary method for the generation of the signature data, occurs at the point of the message digest which corresponds in the known method with the result of the cryptographic reversal of the signature algorithm to the signature data to be checked with use of the verification key.

LIST OF REFERENCE SIGNS

100 computer
108 data link
110 application
120 trustworthy signature hardware
121 card reader
122 keypad
123 display
124 microprocessor
125 interface
126 signature card
127 interface
128 microprocessor
129 memory
130-230 method steps

The invention claimed is:

1. A method performed by signature hardware for generating a digital signature, the method comprising:
receiving a message digest and descriptive data from an application executed on a computer, the message digest being generated from digital content, the descriptive data relating to a desired digital signature;
outputting the received descriptive data in a representation perceptible to humans;
receiving validation data from an external source in response to the outputting;
generating signature data from the message digest and the descriptive data based on a linking of the message digest with the descriptive data in response to the receiving the validation data, the signature data corresponding to the desired digital signature; and
transmitting the signature data to the application, wherein the message digest is generated by executing a one-way function on the digital content, wherein the method further comprises executing the one-way function on the descriptive data for generating a hash value having a length of the message digest, and wherein the linking further comprises executing an exclusive-or operation between the message digest and the generated hash value.

2. The method according to claim 1, wherein the generating the signature data generates at least part of the signature data based on both the message digest and the descriptive data.

3. The method according to claim 2, wherein the linking includes executing a one-way function on at least one of the descriptive data or the message digest.

4. The method according to claim 3, wherein the message digest is generated by executing the one-way function.

5. The method according to claim 1, wherein the receiving the validation data includes receiving the validation data via an input interface of the signature hardware.

6. The method according to claim 5, wherein the validation data includes user authentication data.

7. The method according to claim 6, wherein the user authentication data includes a password or a biometric feature.

8. The method according to claim 1, wherein the descriptive data depends on the digital content.

9. The method according to claim 8, wherein the descriptive data is extracted from the digital content at a determined or marked region of the digital content.

10. The method according to claim 8, wherein the descriptive data is derived from a text input of a user, a screen view selected by the user or a speech playback of the digital content selected by the user.

11. The method according to claim 10, wherein the outputting the descriptive data includes displaying the text or screen view on a display of the signature hardware, or reproducing the text or speech playback by a loudspeaker of the signature hardware.

12. The method according to claim 11, wherein the reproducing the text includes generating a synthetic speech reproduction of the text.

13. The method according to claim 1, wherein the signature data is transmitted to the application to be combined with the descriptive data and the digital content to form a signed digital content.

14. The method according to claim 1, wherein a correspondence of the signature data to the message digest and the descriptive data is checked to verify that the signature data is valid.

15. Signature hardware, comprising:
- a memory having computer-readable instructions stored thereon; and
- at least one processor communicatively coupled to the memory and configured to execute the computer-readable instructions to carry out the method according to claim 1.

16. A non-transitory computer-readable medium storing digitally coded instructions that, when executed by at least one processor, cause the at least one processor to perform the method according to claim 1.

* * * * *